July 6, 1926.  1,591,817
P. E. HAWKINSON
PROCESS OF REPAIRING PNEUMATIC TIRE CASINGS
Filed August 15, 1924   2 Sheets-Sheet 1
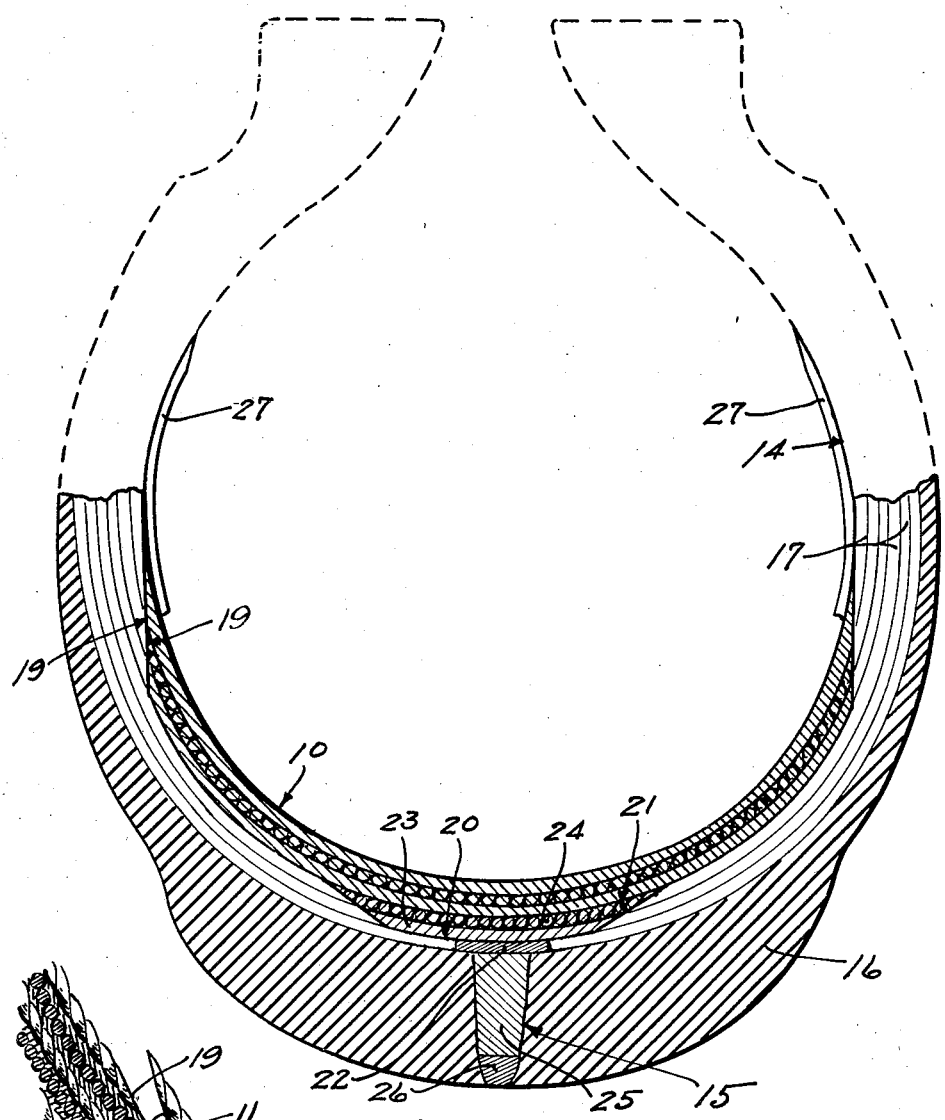
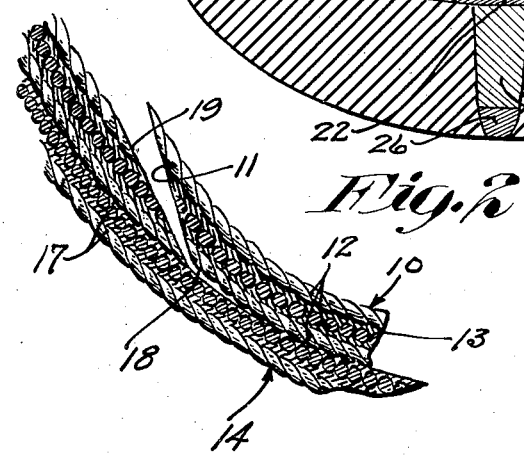
Inventor
Paul E. Hawkinson
By his Attorneys

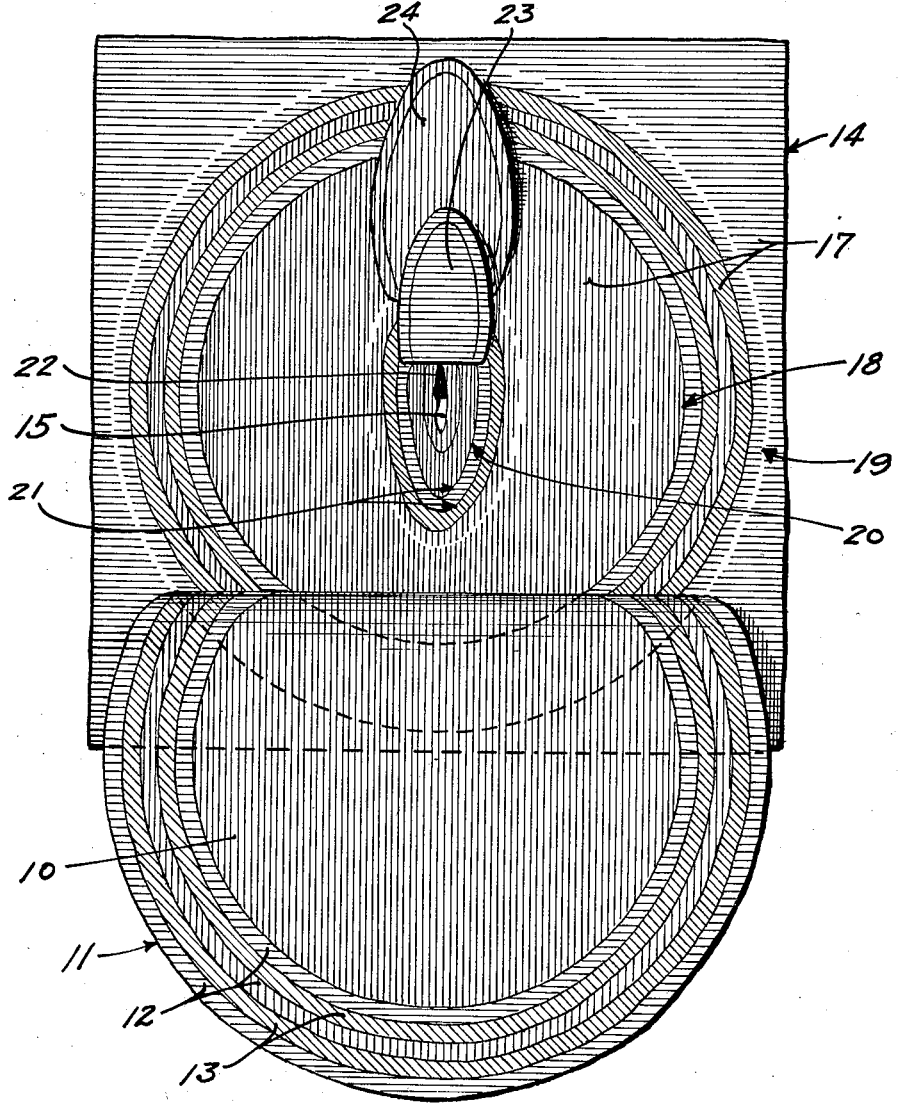

Patented July 6, 1926.

1,591,817

UNITED STATES PATENT OFFICE.

PAUL E. HAWKINSON, OF MINNEAPOLIS, MINNESOTA, ASSIGNOR TO KE HAWKE MFG. CO., OF MINNEAPOLIS, MINNESOTA, A CORPORATION OF MINNESOTA.

PROCESS OF REPAIRING PNEUMATIC-TIRE CASINGS.

Application filed August 15, 1924. Serial No. 732,327.

My present invention provides an improved multiple ply patch and the process of repairing pneumatic cord tire casings and the making of said patch for use in such repairing.

This patch is disclosed and broadly claimed in my U. S. Letters Patent No. 1,436,394, of date November 21, 1921, and certain steps in the improved process of repairing pneumatic tire casings are disclosed and broadly claimed in a co-pending application, executed by me of even date herewith.

In the accompanying drawings, which illustrate the invention, like characters indicate like parts throughout the several views:

Referring to the drawings:

Fig. 1 is a view partly in diagram and partly in transverse section showing a pneumatic cord tire casing having an injury that has been repaired in accordance with the invention;

Fig. 2 is a fragmentary view, on a large scale, showing a portion of the patch and casing; and Fig. 3 is a fragmentary view looking at the inside of a tire casing and showing the single and multiple ply patches partly placed in position.

It is thought that the improved multiple ply patch will be best understood from the process of producing the same, and the first step in the improved process of repairing pneumatic cord tire casings relates to the making of this multiple ply patch, without corners, preferably round, and includes the procuring of a piece of multiple ply cord fabric similar to the casing to be repaired, and which fabric has the cords of successive plies running transversely or at an angle to each other and is dished so that a patch cut therefrom will have the same curvature as the casing to which it is applied. This fabric is preferably procured from a used pneumatic cord tire casing by removing therefrom plies of the desired number welded together; buffing both faces of the removed plies to remove the rubber therefrom; cutting a multiple ply patch 10 from a good part thereof and in beveling at 11 the marginal portion of said patch on its convex face to a sharp edge. The cords and rubber forming the patch 10 are indicated by the numerals 12 and 13, respectively. It may be here stated that patches of this type are numbered and carried in stock in various different sizes and number of plies. The purpose of preferably making a patch from material taken from a used casing is that all of the stretch has been taken out of the same and hence, has the same characteristics as the casing being repaired and as the patch is perfectly shaped cannot stretch, thus eliminating any tendency to bulge.

The second step in the improved process of repairing pneumatic cord tire casings relates to the preparing or cutting down of a casing at an injury to receive a repair, and the same will be more readily understood by reference to the drawings in which is illustrated a pneumatic cord tire casing 14 having an injury in the form of a hole 15 which extends through its tread 16 and plies 17 which, as shown, are six in number. The number of plies in the patch 10 must also be preferably half of the number of plies in the casing 14 which, in the present case, is three. This second step includes cutting and removing portions of the three innermost plies 17 to form an opening 18 at the injury 15 to receive the patch 10, and of a size corresponding to the size of said patch at the inner edge of its bevel 11; in buffing the exposed portion of the fourth ply 17 in the opening 18; in beveling at 19 the marginal portions of the three inner plies 17 at said opening to sharp edges. The outer edge of this bevel 19 should correspond to the periphery of the patch 10 so that when the patch is applied in the opening 18 a close bevel joint will be formed between the patch and the casing.

Next in skiving an opening in the fourth ply starting say about an inch and one-half away from the injury, and in skiving an opening in a fifth ply starting say one inch away from the injury. This skiving should be such as to form a long bevel at the marginal portion of each of the fourth and fifth plies and extend all the way around the injury and follow the general outline thereof. Then carefully trim the edge of the injury in the outer or sixth ply, and it is important not to cut away any more of said ply than is necessary. The skiving of the fourth and fifth plies and the trimming of the sixth ply leaves a relatively small opening 20 in the casing 14. Next roughen, by means of sand paper or otherwise, the exposed rubber between the plies at the opening 20. And finally, give both sides of the patch 10 and the area of the casing prepared to receive the repair, as well as a portion of the innermost ply surrounding the opening 18, two coats of rubber cement, the first of which should be relatively thin so as to penetrate the cord fabric and allowed to thoroughly dry before the second coat is applied. Before a patch is used, a sheet of cushion rubber, say one-sixty-fourth of an inch in thickness, is applied to the convex face of the patch 10 having in its outer face a sheet of holland for protecting the same.

The third step in the improved process of repairing pneumatic cord tire casings relates to the building up of the repair and the application of the patch 10, and includes the placing of a small piece of cushion gum 22, preferably one-sixty-fourth of an inch in thickness, in the opening 20 in the sixth or outermost ply 17, next in cutting from a small piece of new cord repair fabric a single ply patch 23 of such size as to fit the opening formed in the fifth ply, in beveling the marginal portion of said patch to a sharp edge and placing the same in said opening with its beveled marginal portion overlapping the beveled marginal portion of said ply and with its cords extending in the same direction as the cords in the respective ply and overlapping the same, and in pressing said patch down thoroughly, next in cutting from said piece of the new cord repair fabric a second single ply patch 24 of such size as to fit the opening formed in the fourth ply, in beveling the marginal portion of said second patch and placing the same in said opening with its beveled marginal portion overlapping the beveled marginal portion of said ply and with its cords extending in the same direction as the cords in the respective ply and overlapping the same, and in pressing said patch down thoroughly. In placing the patches 23 and 24 in the opening 20, it is important to so position the same that the ends of their cords, which are beveled by the skiving of said patches, overlap the end of the respective cords in the plies 5 and 6, which are also beveled by skiving of said plies, to splice the same together, thus making the cords in said patches continuous with the respective cords in the casing. Next in placing the patch 10 in the opening 20, after removing the protecting holland therefrom, with its beveled marginal portion 11 overlapping the beveled marginal portions 19 of the plies surrounding said opening and with its cords extending in the same direction as the cords in the respective plies and overlapping the same. One of the primary objects of making the patch 10 round is that the same may be turned, after being placed in the opening 18, to align the cords therein with the respective cords in the casing. And finally in pressing the patch 10 down thoroughly, which is adhesively held until vulcanized. By beveling the marginal portions of the multiple ply patch and the respective plies of the casing, the ends of the cords in said patch and plies are likewise beveled so that when the patch 10 is applied with its cords running in the same direction as the cords in the respective plies in the casing, the ends of said cords are overlapped and spliced together, thus making the cords in the repair continuous with the cords in the casing, which, together with the patches 23 and 24, forms a repair that is not only as strong as the casing but forms a perfect section thereof without any high or low spots whatsoever and with the same flexibility as the casing, which is highly important in order to make the repair stand up.

The improved process also includes placing a piece of cushion gum 25 in the hole in the tread and in filling said hole with a tread stock 26 well rolled in and trimmed with a knife to the general tread design of the casing.

A light two-ply reinforcement 27 cut from the same material as the patch 10, and to one surface of which has been applied two coats of rubber cement and a sheet of cushion gum as in said patch, may be applied over the patch 10 and surrounding portion of the innermost ply 17 which, as previously stated, has been given two coats of cement. In applying this reinforcement to a casing it is important that the cords in the outer ply thereof extend transversely of the cords in the inner ply of the patch 10 and casing. This reinforcement must be pressed down thoroughly.

It may be here stated that during the cutting down process, the casing is held turned inside out, after the outline of the patch and its skiving have been indicated thereon by patterns or otherwise, while the respective portion of the casing is in normal position; but during the building up process, it is highly important that the casing throughout the section being repaired is in normal position. The repair is then vulcanized.

What I claim is:

1. An improved process of repairing a pneumatic cord tire casing which consists in providing a round cord patch having its marginal portion beveled to a sharp edge, in forming a round opening in one of the plies of the casing for the patch and in beveling the marginal portion thereof to a sharp edge and reverse from that of said patch for overlapping engagement therewith, in placing the patch in the opening and turning the same to align its cords with the cords in said inner ply and with the beveled ends of the cords in said ply and patch overlapping each other, and in welding the patch in position and the beveled overlapped ends of the cords together to form splices.

2. An improved process of repairing a pneumatic cord tire casing which consists in providing a round multiple ply cord patch with the cords in successive plies extending transversely of each other and in which said plies are welded together and have progressively extended marginal portions beveled to sharp edges, in cutting and removing portions of the inner plies of the casing corresponding in number to that of the patch to form a round opening for said patch, in beveling said inner plies of the casing at said opening to sharp edges to form progressively extended marginal portions, the beveled marginal portions of said patch and casing being reversely formed for overlapping engagement, in placing the patch in said opening and turning the same to align the cords in its several plies with the cords in the corresponding plies of the casing and with the ends of the cords in the corresponding plies of the casing and patch overlapping each other, and in welding the patch in position and the overlapped ends of the cords together to form splices.

In testimony whereof I affix my signature.

PAUL E. HAWKINSON.